US011496458B1

(12) United States Patent
Anand et al.

(10) Patent No.: US 11,496,458 B1
(45) Date of Patent: Nov. 8, 2022

(54) APPARATUSES AND METHODS FOR IMPROVED SESSION AUTHENTICATION

(71) Applicant: Wells Fargo Bank, N.A., San Francisco, CA (US)

(72) Inventors: Ganesan Anand, Fremont, CA (US); Bipin M. Sahni, Pleasanton, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 381 days.

(21) Appl. No.: 16/502,456

(22) Filed: Jul. 3, 2019

(51) Int. Cl.
*H04L 29/06* (2006.01)
*G06F 3/01* (2006.01)
*G06K 9/00* (2022.01)
*H04L 9/40* (2022.01)
*H04L 67/141* (2022.01)

(52) U.S. Cl.
CPC .......... *H04L 63/083* (2013.01); *G06F 3/013* (2013.01); *H04L 67/141* (2013.01)

(58) Field of Classification Search
CPC ...... H04L 63/083; H04L 67/141; G06F 3/013
See application file for complete search history.

(56) References Cited

U.S. PATENT DOCUMENTS

| 2015/0324562 | A1* | 11/2015 | Scavezze | G10L 15/22 345/156 |
| 2015/0381602 | A1* | 12/2015 | Grim | H04W 12/30 726/4 |
| 2017/0318019 | A1* | 11/2017 | Gordon | H04L 9/3226 |
| 2018/0063709 | A1* | 3/2018 | Morrison | H04W 12/069 |

* cited by examiner

*Primary Examiner* — Noura Zoubair
(74) *Attorney, Agent, or Firm* — Womble Bond Dickinson (US) LLP (57) ABSTRACT

A method, apparatus, and computer program product for establishing an authenticated online session are provided. An example method includes receiving a request for an authenticated online session and causing, by display circuitry, presentation of an input pattern to a user. The method further includes receiving, by gaze detection circuitry, one or more images of the user's eye captured during presentation of the input pattern, and determining, by the gaze detection circuitry, an identification code represented by the one or more images. The method also includes receiving, by contextual evaluation circuitry, contextual device data of a user device associated with the user during presentation of the input pattern. The method further includes establishing, by authentication circuitry, the authenticated online session based upon the identification code and the contextual device data.

20 Claims, 5 Drawing Sheets

APPARATUSES AND METHODS FOR IMPROVED SESSION AUTHENTICATION

TECHNOLOGICAL FIELD

Example embodiments of the present invention relate generally to session establishment and, more particularly, to the use of contextual device data to improve session authentication.

BACKGROUND

The process for establishing online sessions between entities often requires completion of various security measures to prevent unauthorized access. In some cases, these security measures require authentication of a user in order to verify the identity of the user requesting the online session. Furthermore, user inputs of personal identification numbers (PINs) may facilitate this authentication process.

BRIEF SUMMARY

Traditional methods for establishing a secure online session and verifying the identity of a user have become increasing susceptible to attack due to the widespread availability of user information. For example, a user's email address, account credentials, identification numbers, and the like may be stolen or otherwise known to an unauthorized party. Many systems rely upon the physical input (e.g., via a touchpad display) of a user's PIN as the only verification step to establish an online session, such as when a user inputs his or her PIN at an automated teller machine (ATM). An increasingly popular trend is to rely upon biometric information of a user (e.g., fingerprint scans, eye scans, etc.) to attempt to improve security of the authentication process. In some instances, however, customers are hesitant or unwilling to provide biometric information. Furthermore, privacy advocates are becoming increasingly suspicious of the ways in which entities store and use biometric data.

To solve these issues and others, example implementations of embodiments of the present invention may utilize a contextual authentication server to provide increased security in the establishment of authenticated online sessions. Embodiments of the present disclosure may first obtain an identification code (e.g., PIN input or otherwise) via presentation of an input pattern and corresponding detection of a user's gaze for inputting said identification code. During input of the identification code (e.g., via a user's eye(s)), contextual device data is received from a user device associated with the user for improving the security associated with the session authentication process. In this way, the inventors have identified that the current increase in the number of user devices (e.g., smartphones, tablets, smart glasses, wearable technology, and the like) and a new and wider range of contextual information regarding the context surrounding the user has created a new opportunity for solutions for securely establishing an online session which were historically unavailable. In doing so, such example implementations confront and solve at least two technical challenges: (1) they reliably secure online sessions from unauthorized access, and (2) they avoid complications associated with retrieving and storing user biometric data.

Systems, apparatuses, methods, and computer program products are disclosed herein for establishing an online session. In one embodiment, with reference to the claimed method, a method for establishing an authenticated online session may include receiving a request for an authenticated online session. The method may further include causing, by display circuitry, presentation of an input pattern to a user. The method may also include receiving, by gaze detection circuitry, one or more images of the user's eye captured during presentation of the input pattern and determining, by the gaze detection circuitry, an identification code represented by the one or more images. The method may also include receiving, by contextual evaluation circuitry, contextual device data of a user device associated with the user during presentation of the input pattern. The method may further include establishing, by authentication circuitry, the authenticated online session based upon the identification code and the contextual device data.

In some embodiments, causing presentation of the input pattern to the user may further include displaying the input pattern on a screen of the user device. In other embodiments, causing presentation of the input pattern to the user may further include displaying the input pattern as an augmented reality object. In any embodiment, the input pattern may include a plurality of alphanumeric characters.

In some cases, determining the identification code may further include identifying, via the gaze detection circuitry, a gaze direction of the user's eye. In such an embodiment, the method may include comparing, via the gaze detection circuitry, the gaze direction of the user's eye with a corresponding location defined by the input pattern and determining, via the gaze detection circuitry, the identification code input based upon the correlation between the gaze direction and the corresponding location of the input pattern.

In some further embodiments, establishing the authenticated online session may include comparing, via the authentication circuitry, the inputted identification code with a verified identification code associated with the user. In an instance in which the identification code satisfies identification criteria, the method may include establishing, via the authentication circuitry, the authenticated online session.

In such an embodiment, the gaze direction of the user's eye may be iteratively identified over a time in which the identification code is inputted.

In some cases, the contextual device data may include contextual parameters, and the contextual parameters may include one or more of device orientation data, entry speed data, device proximity data, device altitude data, device location data, internet protocol (IP) data, or identification data. In such an embodiment, the method may include determining, via the contextual determination circuitry, a contextual score based upon one or more contextual parameters. In an instance in which the contextual score satisfies a secure context threshold, the method may include establishing, via the authentication circuitry, the authenticated online session.

In some further embodiments, the method may include determining, via the contextual determination circuitry, the contextual score via a polynomial regression.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a contextual authentication server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by a contextual authentication server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the contextual authentication server 200 or other computing device via a network.

As used herein, the term "contextual parameter database" refers to a data structure or repository for storing contextual device data, contextual parameters, and the like. Similarly, the "contextual parameters" of the contextual parameter database may refer to data generated by or relevant to a user device (e.g., device orientation data, entry speed data, device proximity data, device altitude data, device location data, internet protocol (IP) data, or identification data, or the like). The contextual parameter database may be accessible by one or more software applications of the contextual authentication server 200.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

Figure 1:
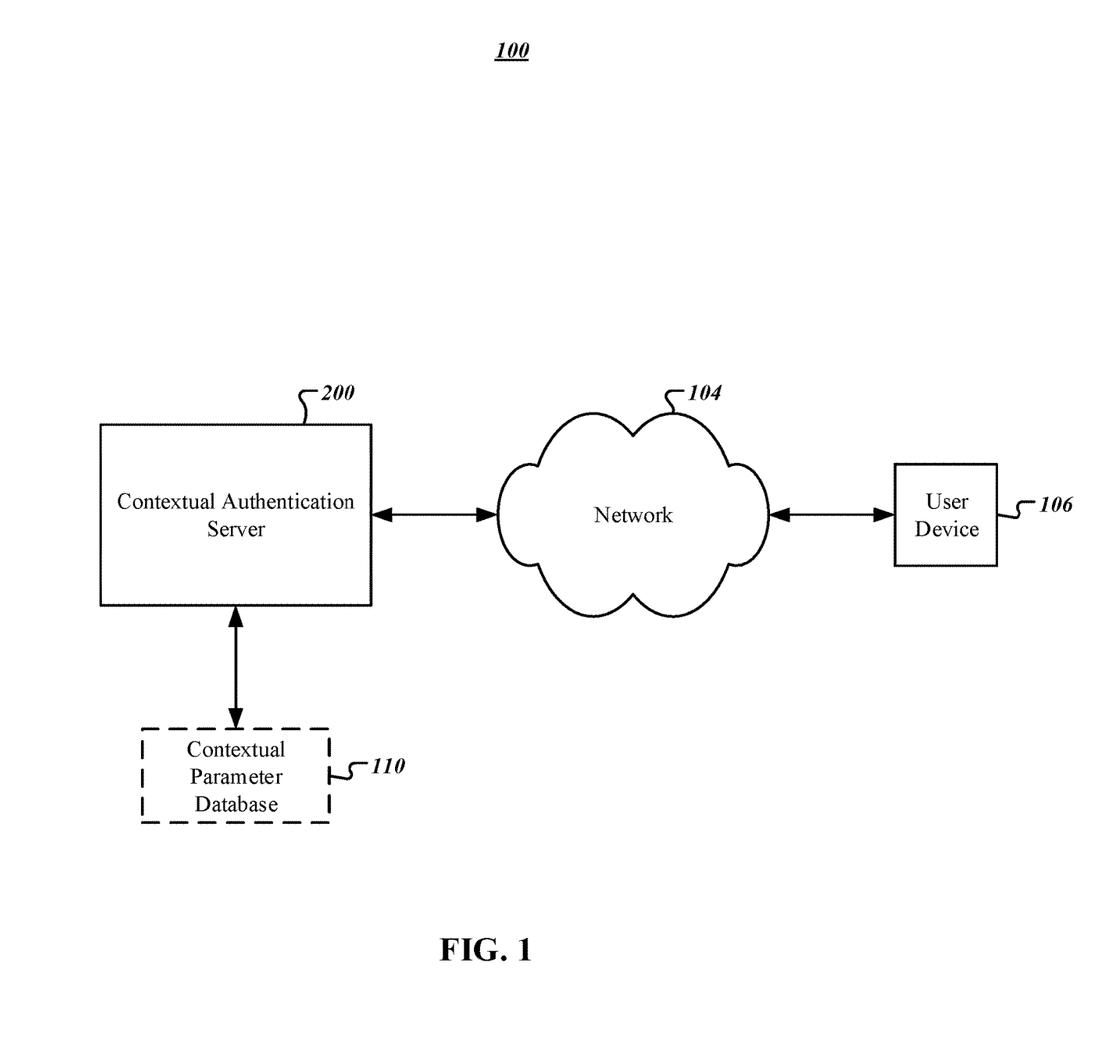
FIG. 1 illustrates a system diagram including devices that may be involved in some example embodiments described herein.

With reference to FIG. 1, an example system 100 is illustrated with an apparatus (e.g., a contextual authentication server 200) communicably connected via a network 104 to a user device 106. The example system 100 may also include a contextual parameter database 110 that may be hosted by the contextual authentication server 200 or otherwise hosted by devices in communication with the contextual authentication server 200.

The contextual authentication server 200 may include circuitry, networked processors, or the like configured to perform some or all of the apparatus-based (e.g., contextual authentication server-based) processes described herein, and may be any suitable network server and/or other type of processing device. In this regard, contextual authentication server 200 may be embodied by any of a variety of devices. For example, the contextual authentication server 200 may be configured to receive/transmit data (e.g., input patterns, contextual parameters, etc.) and may include any of a variety of fixed terminals, such as an ATM, server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the contextual authentication server 200 may be located remotely from the user device 106 and/or contextual parameter database 110 (e.g., where the contextual authentication server 200 comprises an ATM and the user device 106 comprises a user's smartphone), although in other embodiments, the contextual authentication server 200 may comprise the user device 106 and/or the contextual parameter database 110 (e.g., where the functions of the contextual authentication server 200, user device 106, and potentially also the contextual parameter database 110 are performed by the user's smartphone). The contextual authentication server 200 may, in some embodiments, comprise several servers or computing devices performing interconnected and/or distributed functions. Despite the many arrangements contemplated herein, the contextual authentication server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The user device 106 may refer to a user device associated with a user and may be a cellular telephone (e.g., a smartphone and/or other type of mobile telephone), laptop, tablet, electronic reader, e-book device, media device, wearable, smart glasses, smartwatch, or any combination of the above. Although a single user device 106 is illustrated, the example system 100 may include any number of user devices associated with the same user or any number of respective other users.

The contextual parameter database 110 may be stored by any suitable storage device configured to store some or all of the information described herein (e.g., memory 204 of the contextual authentication server 200 or a separate memory system separate from the contextual authentication server 200, such as one or more database systems, backend data servers, network databases, cloud storage devices, or the like provided by another device (e.g., online application or $3^{rd}$ party provider) or the user device 106). The contextual parameter database 110 may comprise data received from the contextual authentication server 200 (e.g., via a memory 204 and/or processor(s) 202) or the user device 106, and the corresponding storage device may thus store this data.

Figure 2:
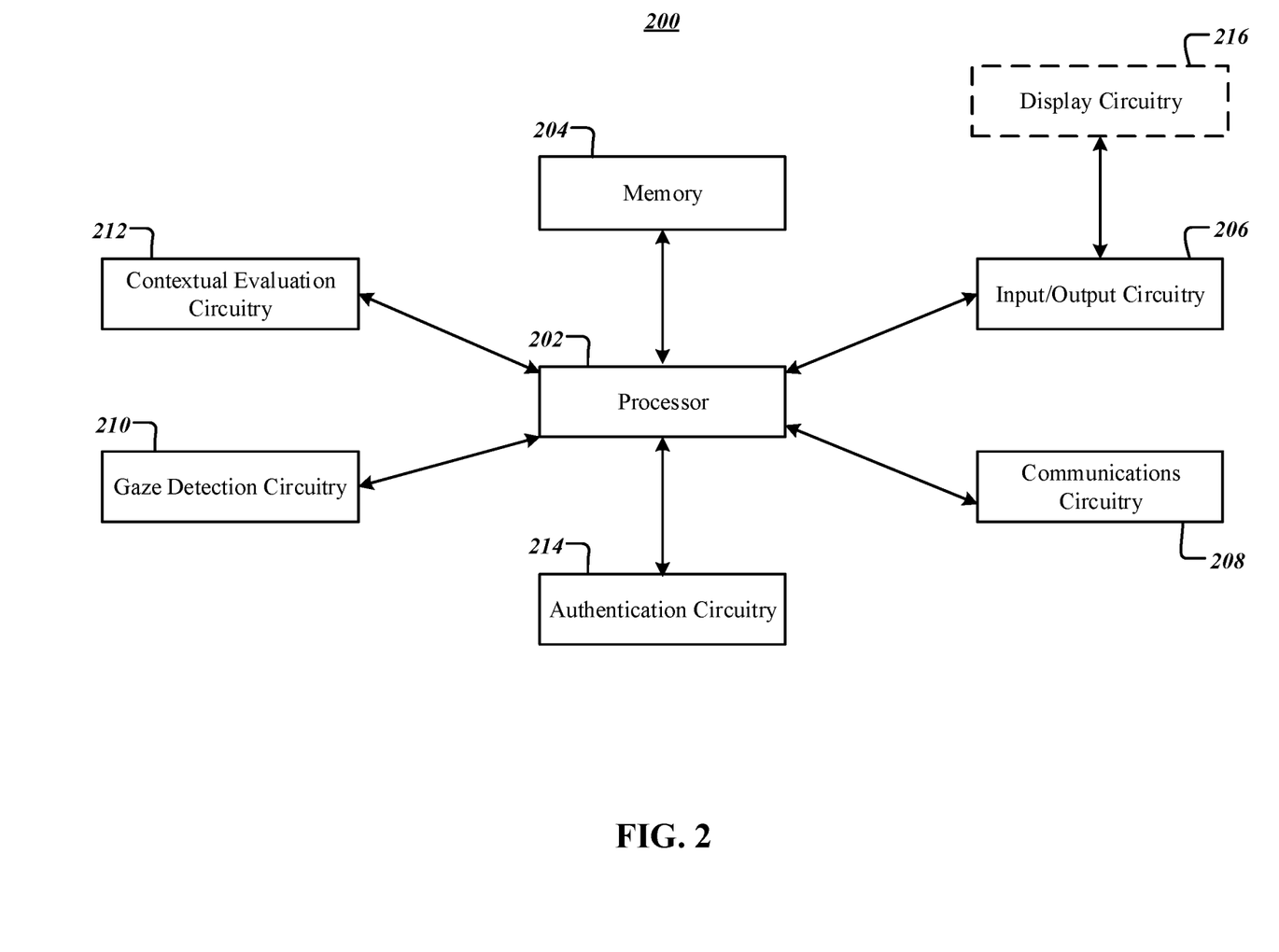
FIG. 2 illustrates a schematic block diagram of example circuitry that may perform various operations, in accordance with some example embodiments described herein.

As illustrated in FIG. 2, the contextual authentication server 200 may include a processor 202, a memory 204, communications circuitry 208, input/output circuitry 206, and, in some embodiments, display circuitry 216. Moreover, the contextual authentication server 200 may include gaze detection circuitry 210, contextual evaluation circuitry 212, and authentication circuitry 214. The contextual authentication server 200 may be configured to execute the operations described below in connection with FIGS. 3-5. Although components 202-216 are described in some cases using functional language, it should be understood that the particular implementations necessarily include the use of particular hardware. It should also be understood that certain of these components 202-216 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the contextual authentication server 200 may be housed within the user device 106. It will be understood in this regard that some of the components described in connection with the contextual authentication server 200 may be housed within one of these devices, while other components are housed within another of these devices, or by yet another device not expressly illustrated in FIG. 1. In some embodiments, the contextual authentication server 200 may operate as a central repository that is accessible by various user devices (e.g., computing systems associated with customers, employees, etc.).

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the contextual authentication server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the contextual authentication server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the contextual authentication server 200 to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the contextual authentication server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The contextual authentication server 200 further includes input/output circuitry 206 that may, in turn, be in communication with processor 202 to provide output to a user and to receive input from a user, user device, or another source (e.g., so as receive and/or contextual device data). In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like). In some embodiments, the input/output circuitry 206 may further include display circuitry 216. As described hereafter, the display circuitry 216 may be in communication with processor 202 to display an input pattern (e.g., on a display of the user device 106, as a virtual reality object, and/or the like) output to a user and to receive input from a user, user device, or another source.

The communications circuitry 208 may be any means such as a device or circuitry embodied in either hardware or a combination of hardware and software that is configured to receive and/or transmit data from/to a network and/or any other device, circuitry, or module in communication with the contextual authentication server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the contextual authentication server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The gaze detection circuitry 210 includes hardware components designed to capture one or more images of a user's eye during input of an identification code and analyze said images. The gaze detection circuitry 210 may utilize processing circuitry, such as the processor 202, to perform its corresponding operations, and may utilize memory 204 to store collected information. By way of example, in some instances, a user may input an identification code (e.g., personal identification number (PIN) or the like) via his or her eyes (e.g., gazing at the identification code). The gaze detection circuitry 210 may capture and analyze one or more images of the user's eye(s) during this input in order to determine the identification code input.

The contextual evaluation circuitry 212 includes hardware components designed to receive contextual device data of a user device 106 associated with a user device during input of an identification code. The contextual evaluation circuitry 212 may, in some embodiments, be configured to determine a contextual score based upon one or more contextual parameters of the contextual device data. The contextual evaluation circuitry 212 may utilize processing circuitry, such as the processor 202, to perform its corresponding operations, and may utilize memory 204 to store collected information.

Authentication circuitry 214 includes hardware components designed to establish an authenticated session between the contextual authentication server 200, the user device 106, and/or other devices not illustrated in FIGS. 1-2. For example, the authentication circuitry 214 may, in some embodiments, determine if an identification code input satisfies identification criteria prior to authenticating the online session. Authentication circuitry 214 may utilize processing circuitry, such as the processor 202, to perform its corresponding operations, and may utilize memory 204 to store collected information.

It should also be appreciated that, in some embodiments, the gaze detection circuitry 210, contextual evaluation circuitry 212, display circuitry 216, or authentication circuitry 214, may include a separate processor, specially configured field programmable gate array (FPGA), or application specific interface circuit (ASIC) to perform its corresponding functions.

In addition, computer program instructions and/or other type of code may be loaded onto a computer, processor or other programmable risk maintenance server's circuitry to produce a machine, such that the computer, processor other programmable circuitry that execute the code on the machine create the means for implementing the various functions, including those described in connection with the components of contextual authentication server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Contextual Session Authentication

Figure 3:
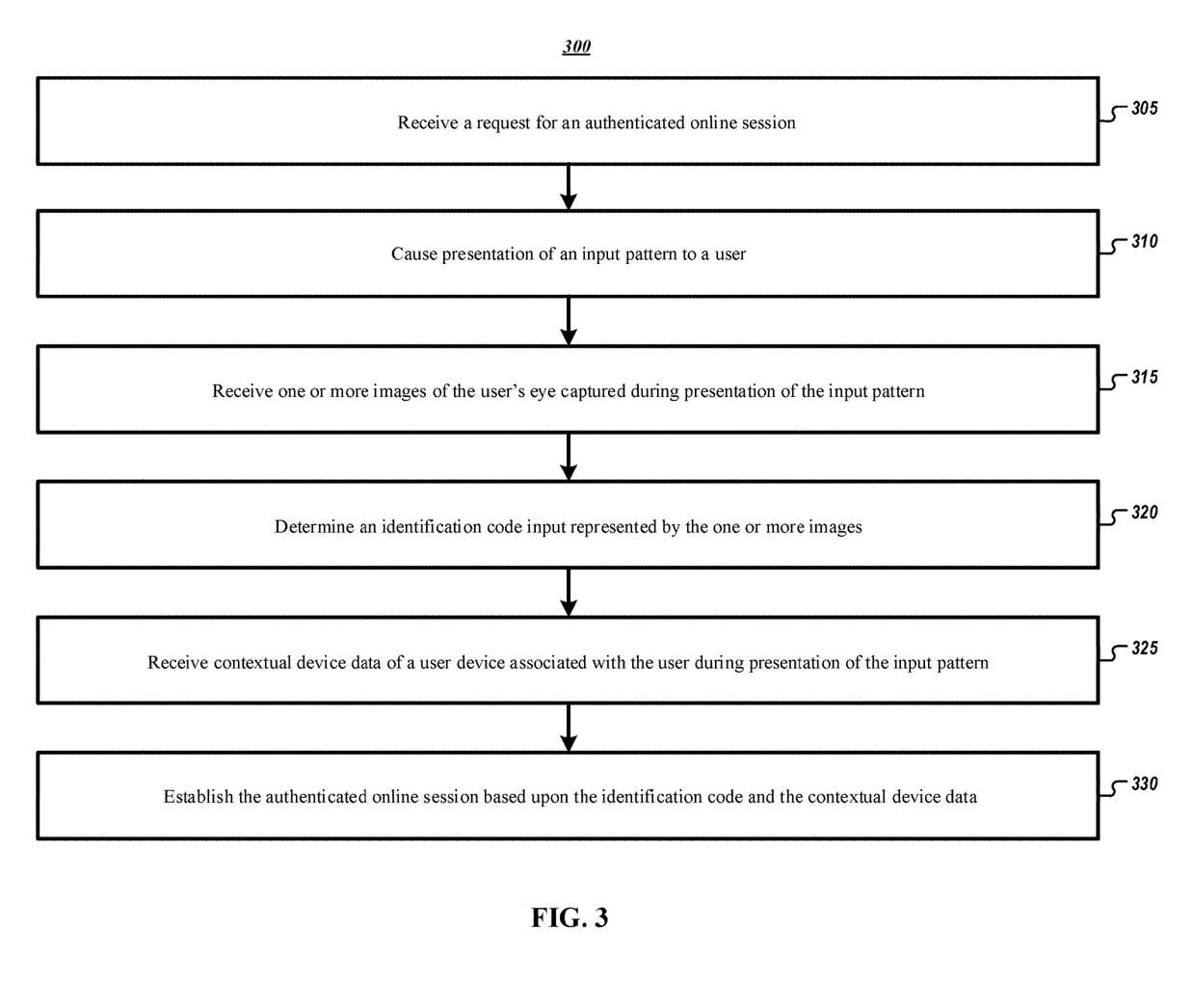
FIG. 3 illustrates an example flowchart for establishing an authenticated session, in accordance with some example embodiments described herein.

FIG. 3 illustrates a flowchart containing a series of operations for establishing an authenticated session. The operations illustrated in FIG. 3 may, for example, be performed by, with the assistance of, and/or under the control of an apparatus (e.g., contextual authentication server 200), as described above. In this regard, performance of the operations may invoke one or more of processor 202, memory 204, input/output circuitry 206, communications circuitry 208, gaze detection circuitry 210, contextual evaluation circuitry 212, authentication circuitry 214, and/or display circuitry 216.

As shown in operation 305, the apparatus (e.g., contextual authentication server 200) includes means, such as input/output circuitry 206, communications circuitry 208, or the like, for receiving a request for an authenticated online session. In some example embodiments, the communications circuitry 208 may receive a request for a session or an instruction to establish a session from a user device 106. By way of example, the user device 106 may request an authorized session with the contextual authentication server 200 (e.g., an authorized session with a financial institution or the like). Similarly, in some embodiments, the user device 106 may receive a request for a session from another device (e.g., a device associated with the financial institution) and may request that a session be established by the contextual authentication server 200. In some other embodiments, the input/output circuitry 206 of the contextual authentication server 200 may receive a request (e.g., via a direct user input or automatically) for a session without input from the user device 106. For instance, the input/output circuitry 206 may receive the request for an authenticated online session from direct user interaction with the contextual authentication server 200, or the authentication circuitry 214 may trigger the request for the online session in an instance in which the contextual authentication server 200 requires a session to complete an internal process. By way of example, a request to establish an authenticated online session (e.g. session) may occur when a user attempts (e.g., via a user device 106) to access one or more applications (e.g., online banking app or the like) supported by the contextual authentication server 200. By way of an additional example, a request for a session may also occur in instances in which a user attempts to access an application or entity (e.g., web application, server, or the like) hosted or provided by a vendor device (e.g., or any $3^{rd}$ party)For example, a user attempting to complete a transaction at an online marketplace may request an authenticated online session.

Thereafter, as shown in operation 310, the apparatus (e.g., contextual authentication server 200) includes means, such as input/output circuitry 206, display circuitry 216, or the like, for causing presentation of an input pattern to a user. As would be evident to one of ordinary skill in the art in light of the present disclosure, a user may provide or otherwise be assigned an identification code (e.g., PIN, access code, or the like) that may be used to verify the identity of the user. By way of example, a user (e.g., during a registration process or otherwise) may select a four (4) digit numeric identification code that may be used by one or more entities to verify the identity of the user. While described herein with reference to numeric identification codes, the present disclosure contemplates that any combination of alphanumeric characters, symbols, images, or the like may be used as an identification code. In the embodiments of the present disclosure as described hereafter with reference to FIG. 4, a user's input of his or her associated identification code may be accomplished via eye movements of the user (e.g., eye tracking, gaze detection, or the like). In this way, the likelihood that entry of a user's identification code is compromised (e.g., as prevalent in traditional physical inputs of a PIN) is reduced or otherwise prevented.

In order to receive input of the identification code via eye movements as described hereafter, the apparatus at operation 310, may cause presentation of an input pattern. For example, the input pattern may include a plurality of alphanumeric characters positioned in any arrangement. By way of a more particular example, the input pattern may comprise numbers of ascending value (e.g., numbers 1-9) arranged in rows and columns (e.g., a telephone keypad). In some embodiments, the arrangement of the alphanumeric characters may dynamically change during input such that eye movements of the user may be more difficult to determine by an unauthorized party. The presentation of the input pattern to the user may, in some embodiments, occur via display of the input pattern on a screen, display, or other medium of the user device 106. By way of example, the contextual authentication server 200 may cause the keypad of a user's mobile device (e.g., user device 106) to display on a screen of the mobile device. In some embodiments, the presentation of the input pattern to the user may occur on a screen or display of an ATM (not shown) separate from the user device 106. In such an embodiment, the ATM (not shown) may present the input pattern to the user and/or capture one or more images of the user's eyes during presentation of the input pattern as described hereafter. Further, the user device 106 (e.g., separate from the ATM) may serve as a source of contextual device data separate from the ATM.

In other embodiments, the presentation of the input pattern to the user may occur as an augmented reality object. By way of example, in some instances the user device 106 may include smart glasses or other wearable technology configured to superimpose 3D images onto the real world view of the user through the smart glasses. In this way, the input pattern (e.g., keypad or the like) may appear as an augmented reality object in the field of view of the user.

Thereafter, as shown in operation 315, the apparatus (e.g., contextual authentication server 200) includes means, such as processor 202, gaze detection circuitry 210, or the like, for receiving one or more images of the user's eye captured during presentation of the input pattern. In some example embodiments, and as described in greater detail below in connection with FIG. 4, operation 315 may include receiving one or more images of a user's eye via a camera (e.g., or equivalent device) of the user device 106. By way of example, an input pattern may be presented to the user as described above with reference to operation 310 such that a plurality of alphanumeric characters are displayed, for example, on a user's mobile phone (e.g., user device 106). A camera of the mobile phone, ATM, or the like may begin capturing (e.g., as a video stream, collection of images, or the like) one or more images of a user's eye. The user may begin selecting each alphanumeric character associated with his or her identification code by directing his or her gaze to (i.e., looking at) each alphanumeric character of his or her identification code in the appropriate order.

Thereafter, as shown in operation 320, the apparatus (e.g., contextual authentication server 200) includes means, such as processor 202, gaze detection circuitry 210, or the like, for determining an identification code represented by the one or more images. As described hereafter with reference to FIG. 4, the gaze detection circuitry 210 may iteratively determine the relative position of a user's eye (e.g., or any portion of the user's eye, pupil, etc.) relative to the input pattern, user's head, or other frame of reference. This relative positioning of the user's eye may be referred to as the user's gaze direction. For each gaze direction, the gaze detection circuitry 210 may identify a corresponding location of the input pattern. Said differently, the gaze detection circuitry 210 may receive a plurality of images of a user's eye and determine a gaze direction for each image as well as a corresponding location of the input pattern for each gaze direction (e.g., where is the user looking?). Subsequently, the graze detection circuitry 210 may determine a correlation between the gaze direction and the corresponding location of the input pattern in order to determine the identification code input of the user.

In some embodiments, as shown in operation 325, the apparatus (e.g., contextual authentication server 200) includes means, such as processor 202, memory 204, contextual evaluation circuitry 212, or the like, for receiving contextual device data of a user device associated with the user during presentation of the input pattern (e.g., during input of the identification code). As described hereafter with reference to FIG. 5, the contextual evaluation circuitry 212 may be configured to receive contextual device data including contextual parameters indicative of the context surrounding the user device 106 during input of the identification code as described above with reference to operations 315, 320. These contextual parameters may include one or more of device orientation data, entry speed data, device proximity data, device altitude data, device location data, internet protocol (IP) data, or identification data, the use of which is configured to further increase the security associated with establishment of the authenticated online session. These contextual parameters may be further used to determine or otherwise calculate a contextual score associated with the user device 106 during input of the identification code.

While described herein with reference to contextual device data received during presentation of the input pattern, the present disclosure contemplates that contextual device data of a user's device may be received at any time relative to the presentation of the input pattern (e.g., before or after presentation). By way of example, in some embodiments, the contextual authentication server 200 may receive contextual device data of the user's device close in time but after presentation of the input pattern. In other embodiments, the contextual authentication server 200 may receive contextual device data of the user's device close in time but prior to presentation of the input pattern.

Figure 5:
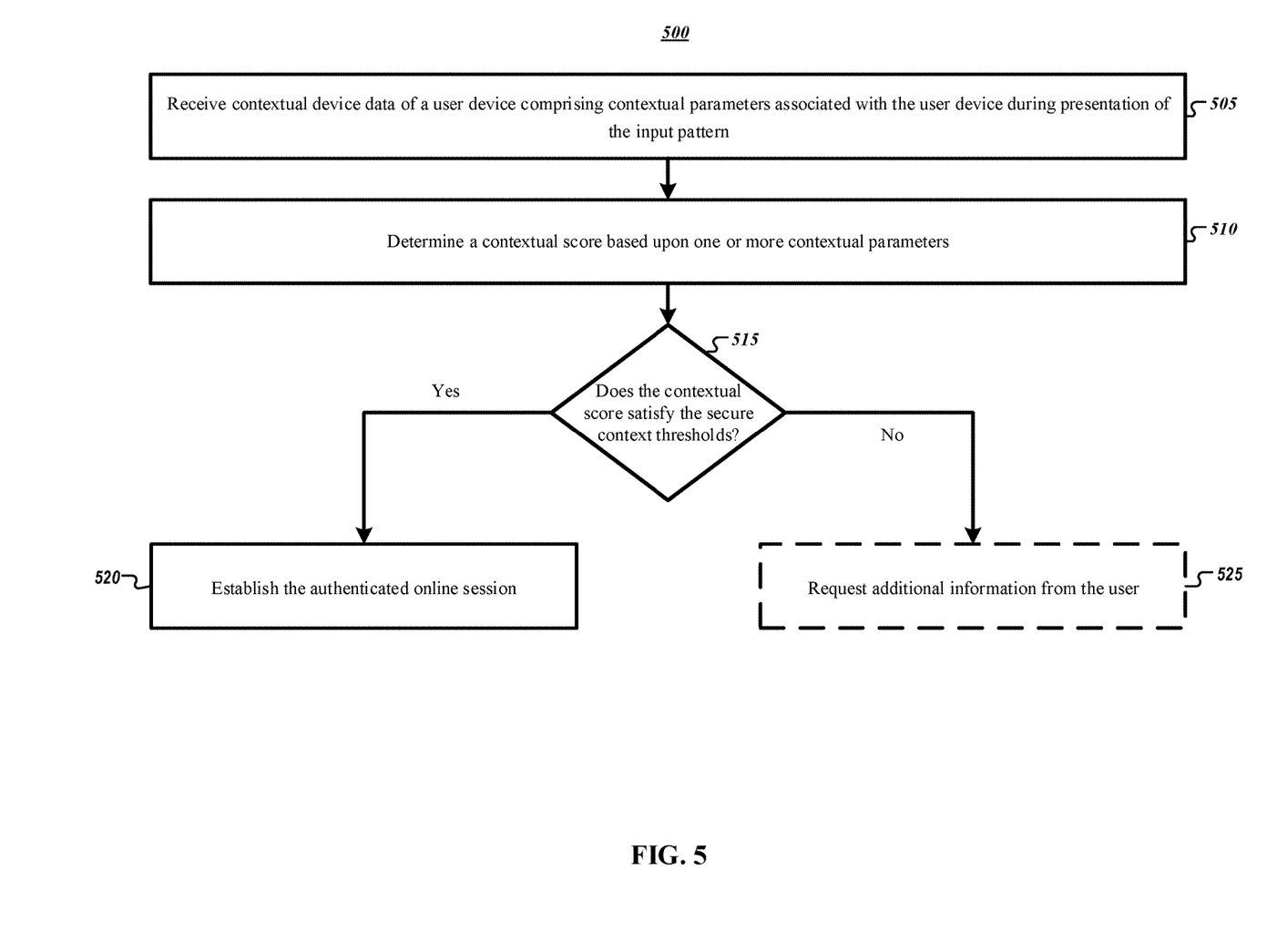
FIG. 5 illustrates an example flowchart for contextual score calculation based upon contextual parameters, in accordance with some example embodiments described herein.

As described more fully with reference to FIG. 5, the contextual authentication server 200 may utilize unique characteristics or parameters associated with the user device 106 during identification code input to further improve the verification of the user. By way of example, the contextual authentication server 200 may receive device orientation data indicative of the position and orientation of the user's device during input pattern presentation. Accelerometers, gyroscopes, and other position sensors of the user device 106 may be used to determine this orientation of the user device 106. In some instances, the orientation data may be compared to orientation data received by the contextual authentication server 200 during prior identification code inputs to verify the user (e.g., is the current user device orientation the same orientation the user usually positions the user device?). In other instances, the orientation data received by the contextual authentication server may be sufficiently unique such that the contextual parameter (e.g., the orientation data) may serve as a portion of the identification code input. By way of example, if the user device 106 is oriented at substantially 90% with respect to the ground during input of the identification code (e.g., as evidenced by prior identification code inputs), this orientation may serve as a portion of the identification code in that further inputs of the identification code may also be required to be inputted with the user device oriented at substantially 90° with respect to the ground.

In some embodiments, as shown in operation 325, the apparatus (e.g., contextual authentication server 200) includes means, such as processor 202, memory 204, authentication circuitry 214, or the like, for establishing the authenticated online session based upon the identification code and the contextual device data. As described hereafter with reference to FIG. 4, the contextual authentication server 200 may establish the authenticated online session in instances in which the identification code input satisfies identification criteria (e.g., substantially matches the identification code of the user. As described hereafter with reference to FIG. 5, the contextual authentication server 200 may also establish the authenticated online session in instances in which the contextual score, determined from the contextual parameters, satisfies a secure context threshold.

Figure 4:
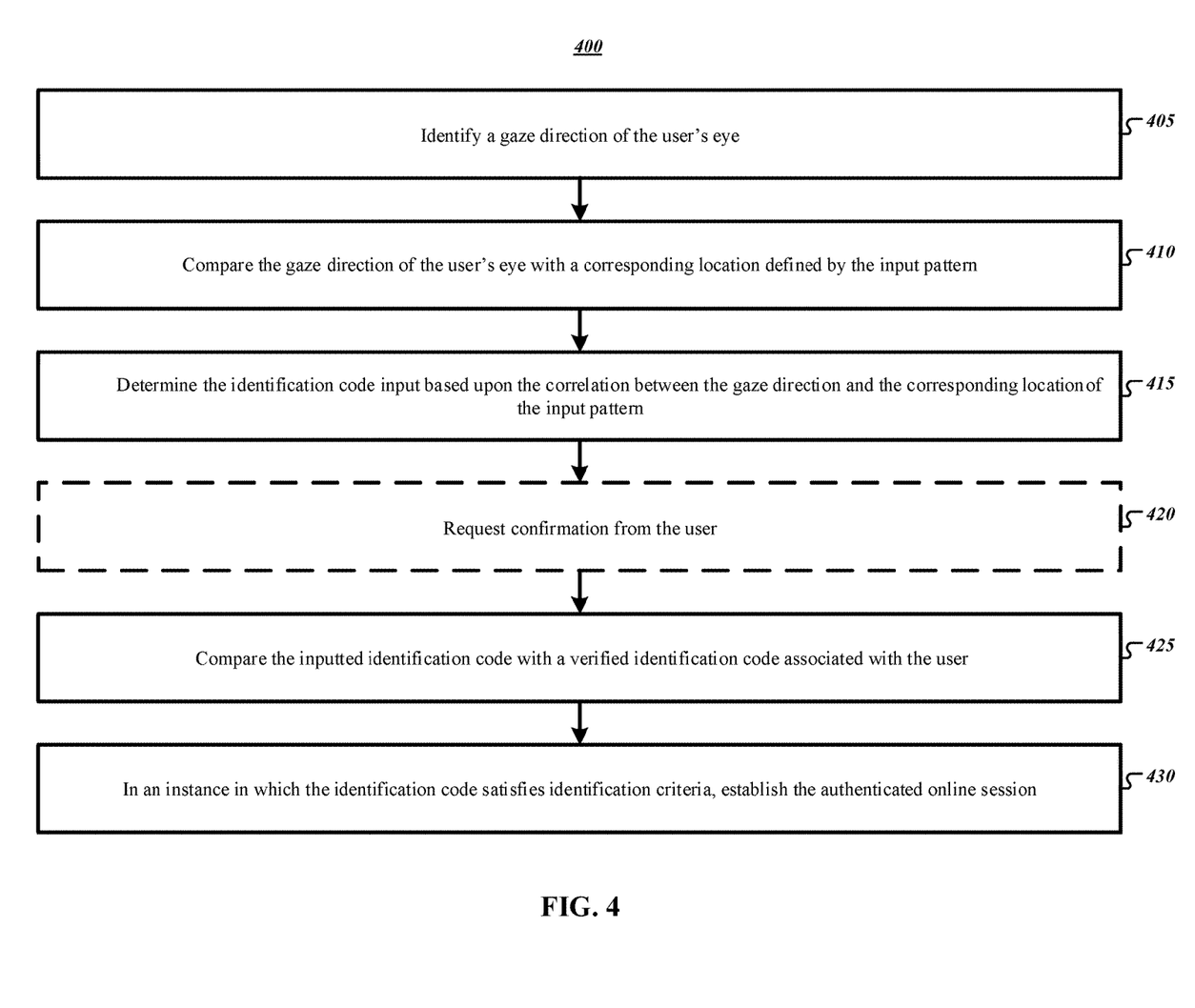
FIG. 4 illustrates an example flowchart for identification code input and associated gaze tracking, in accordance with some example embodiments described herein.

Turning next to FIG. 4, a flowchart is shown for identification code input and associated gaze tracking. The operations illustrated in FIG. 4 may, for example, be performed by, with the assistance of, and/or under the control of an apparatus (e.g., contextual authentication server 200), as described above. In this regard, performance of the operations may invoke one or more of processor 202, memory 204, input/output circuitry 206, communications circuitry 208, gaze detection circuitry 210, contextual evaluation circuitry 212, authentication circuitry 214, and/or display circuitry 216.

As shown in operation 405, the apparatus (e.g., contextual authentication server 200) includes means, such as input/output circuitry 206, gaze detection circuitry 210, or the like, for identifying a gaze direction of the user's eye. As described above with reference to FIG. 3, the gaze detection circuitry 210 may receive one or more images of a user's eye via a camera (e.g., or equivalent device) of the user device 106 and/or ATM (not shown). By way of example, a camera of a mobile phone or ATM may capture (e.g., as a video stream, collection of images, or the like) one or more images of a user's eye during input of an identification code. In order to determine the gaze direction at operation 405, the gaze detection circuitry 210 may identify a user's face, eye, pupil, and/or other related features captured in the one or more images of the user's eye. In some embodiments, the gaze detection circuitry 210 may further identify a vector between the center of the user's pupil and a reflection (e.g., corneal reflections) on the user's eye as a result of the presented input pattern. This vector may be indicative of the user's gaze direction. While described herein with reference to vector techniques and corneal reflections, the present disclosure contemplates that any eye tracking or gaze detection technique (e.g., active light, dark pupil, bright pupil, passive light, and/or the like) may be used to determine the gaze direction of the user's eye. Given that a period of time may elapse during which the user is inputting the identification code (e.g., looking at the alphanumeric characters of the input pattern), the gaze direction of the user's eye may be iteratively identified over the time in which the identification code is inputted.

Thereafter, as shown in operations 410, 415 the apparatus (e.g., contextual authentication server 200) includes means, such as processor 202, gaze detection circuitry 210, or the like, for comparing the gaze direction of the user's eye with a corresponding location defined by the input pattern and determining the identification code input based upon the correlation, respectively. As would be evident to one of ordinary skill in the art in light of the present disclosure, the input pattern (e.g., keypad or the like) may define respective locations for each alphanumeric character in the input pattern. These respective locations may be known by or otherwise provided to the gaze detection circuitry 210 for comparison with the gaze direction(s) of the user's eye identified at operation 405. The gaze detection circuitry 210 may compare the known location of each alphanumeric character in the input pattern with each gaze direction in order to determine the identification code input.

In some instances, as shown in operation 420, the user's gaze may not clearly correspond (e.g., within applicable gaze detection technology tolerances) to a location indicative of a portion of the identification code. Said differently, a user's gaze direction may be located between two alphanumerical characters of the input pattern. As such, the apparatus (e.g., contextual authentication server 200) includes means, such as processor 202, gaze detection circuitry 210, communications circuitry 208, or the like, for requesting confirmation from the user at operation 420. By way of example, in an instance in which the gaze detection circuitry 210 determines that the user's gaze is directed substantially between an identification code input of the number 2 and an identification code input of the number 3, the gaze detection circuitry 210 may be configured to prompt the user to confirm the input (e.g., are you looking at number 3?). In other embodiments, the gaze detection circuitry 210 may instead rely upon identification criteria to address unclear gaze directions. As described hereafter, for example, the identification code associated with the user may require a twenty-five digit input (e.g., or other sufficiently large number of inputs) such that establishment of the session may occur in instances in which the gaze direction corresponds to a sufficient number of these inputs (as defined by the identification criteria). By way of continued example, in an instance in which the gaze detection circuitry 210 determines that the user's gaze corresponds to twenty-four of the twenty-five required inputs, the authentication circuitry 214 may establish the authenticated online session.

Thereafter, as shown in operation 425, the apparatus (e.g., contextual authentication server 200) includes means, such as processor 202, authentication circuitry 214, or the like, for comparing the inputted identification code with a verified identification code associated with the user. As described above, a user may provide or otherwise be assigned an identification code (e.g., PIN, access code, or the like) that may be used to verify the identity of the user. By way of continued example, a user (e.g., during a registration process or otherwise) may select a four (4), a six (6), a twenty-five (25), etc. digit numeric identification code that may be used by one or more entities to verify the identity of the user. As would be evident to one of ordinary skill in the art in light of the present disclosure, the identification code of the user may be any combination of alphanumeric characters, symbols, images, or the like and may be any number of digits. At operation 425, the authentication circuitry 214 may compare the determined identification code (e.g., from the captures gaze(s) of the user's eye(s)) with the assigned, verified, or otherwise known identification code (e.g., a known valid code).

Thereafter, as shown in operation 425, the apparatus (e.g., contextual authentication server 200) includes means, such as processor 202, authentication circuitry 214, or the like, for, in an instance in which the identification code satisfies identification criteria, establishing the authenticated online session. As described above, the contextual authentication server 200 may define identification criteria as a minimum number of determined identification input code digits that match the known or verified identification code digits assigned to the user. By way of example, the identification criteria may define a minimum identification code accuracy of 95% such that the identification code input determined based upon the correlation between the gaze direction and the corresponding location of the input pattern at operation 415 must include 95% of the digits of the known or verified identification code digits. In an instance in which the determined identification code input satisfies the identification criteria, the authentication circuitry 214 may established the authentication online session at operation 430. In an instance in which the determined identification code input fails to satisfy the identification criteria, the authentication circuitry 214 may notify the user of an incorrect input and/or cause presentation of the input pattern for further inputs.

Turning next to FIG. 5, a flowchart is shown for contextual score calculation based upon contextual parameters. The operations illustrated in FIG. 5 may, for example, be performed by, with the assistance of, and/or under the control of an apparatus (e.g., contextual authentication server 200), as described above. In this regard, performance of the operations may invoke one or more of processor 202, memory 204, input/output circuitry 206, communications circuitry 208, gaze detection circuitry 210, contextual evaluation circuitry 212, authentication circuitry 214, and/or display circuitry 216.

Various conventional methods and systems have focused on incorporating biometric attributes (e.g., finger print scans, eye scans, facial recognition, etc.) in order to attempt to improve security of authentication processes. As described above, however, users are becoming increasingly concerned with the amount of their personal information that is used by entities with or without their control. As such, many users are reluctant to provide biometric data to entities, for instance to limit their digital footprint and reduce the likelihood of their biometric information being used by an unauthorized party. Furthermore, regulatory trends suggest that privacy regulation may over time further restrict the ways in which entities store and use biometric data. In order to improve the security associated with establishing an authenticated session, the contextual authentication server 200 and related circuitry of the present disclosure employ contextual device data as illustrated in FIG. 5.

As shown in operation 505, the apparatus (e.g., contextual authentication server 200) includes means, such as input/output circuitry 206, contextual evaluation circuitry 212, or the like, for receiving contextual device data of a user device comprising contextual parameters associated with the user device during presentation of the input pattern (e.g., during input of the identification code). In some cases, the contextual device data may include contextual parameters, and the contextual parameters may include one or more of device orientation data, entry speed data, device proximity data, device altitude data, device location data, internet protocol (IP) data, or identification data.

As described above, the contextual authentication server 200, via the contextual evaluation circuitry 212, may receive device orientation data indicative of the position and orientation of the user's device during presentation of the input pattern (e.g., by the user device and/or an ATM). Accelerometers, gyroscopes, and other position sensors of the user device 106 may be used to determine this orientation of the user device. Similarly, the contextual evaluation circuitry may also receive entry speed data during input of the identification code via the displayed input pattern. As would be evident to one of ordinary skill in the art in light of the present disclosure, the user device 106 may include one or more clocks, timers, or the like configured to determine the time that elapses during a user's input of the identification code (e.g., via the user's eye(s)). In some embodiments, the clocks, timers, etc. of the user device 106 may determine the time (e.g., or delay) between the user's input of individual digits of the identification code (e.g., the time between eye movements). Similar to the device orientation data above, in some embodiments, the entry speed data received by the contextual authentication server 200 may serve as a portion of the identification code input. By way of example, if the user's input of the identification code includes a delay between digit inputs, this delay may serve as a portion of the identification code in that further inputs of the identification code may also be required to include this delay between digit inputs (e.g., between eye movements).

The contextual authentication server 200, via the contextual evaluation circuitry 212, may also receive device proximity data, device altitude data, and/or device location data. As described above, the user device 106 may include various position sensors as well as location sensors (e.g., GPS, RFID, or the like) such that the user device 106 may be configured to determine a relative position between the user and the user device 106, an altitude of the user (e.g., determined via GPS data or the like), and location data (e.g., determined via GPS data, Wi-Fi connections, etc.). The contextual evaluation circuitry 212 may be configured to utilize these contextual parameters to improve the security of the session authentication. By way of example, the user may historically request a session (e.g., attempt to access an online application or the like) while located at his or her office desk. As such, the contextual evaluation circuitry 212 may receive location data, altitude data, and device proximity data during input of the identification code and determine if these contextual device parameters are sufficiently similar to historical location data, altitude data, and device proximity data indicative of the user being located at his or her office desk. In conjunction with the other contextual device parameters described herein, the contextual evaluation circuitry 212 may determine a secure context (e.g., based upon threshold compliance described hereafter) in order to improve session authentication security.

The contextual authentication server 200, via the contextual evaluation circuitry 212, may also receive internet protocol (IP) data or identification data. As would be evident to one of ordinary skill in the art in light of the present disclosure, the user and user device 106 may be associated with various user profiles, usernames, or other identifying information. As such and to ensure the accuracy of the user's identity in inputting the identification code, the contextual evaluation circuitry 212 may receive IP data and/or identification data during input of the identification code. Said differently, during input of the identification code as described above with reference to FIG. 4, the contextual evaluation circuitry may request or otherwise receive the IP address of the user device 106, a username associated with the user and/or user device 106 (e.g., if previously received/registered), and/or browser cookies (e.g., web cookies, http cookies, etc.) indicative of a prior session with the user device 106. In conjunction with the other contextual device parameters described above, the contextual evaluation circuitry 212 analyze the IP data and identification data in order to determine a secure context (e.g., based upon threshold compliance described hereafter) in order to improve session authentication security.

Thereafter, as shown in operation 510, the apparatus (e.g., contextual authentication server 200) includes means, such as processor 202, contextual evaluation circuitry 212, authentication circuitry 214, or the like, for determining a contextual score based upon one or more of the received contextual parameters. As described above, the contextual authentication server 200 may use some or all of the contextual device data (e.g., contextual parameters) in order to improve the security of the online session. As the volume of contextual device data utilized for this purpose increases, the associated security will also be expected to increase. Although the following disclosure describes determination of a contextual score that considers all of the above described contextual parameters, the present disclosure contemplates that other contextual parameters may additionally or alternatively be considered, and further contemplates that any combination suitable parameters be considered in order to determine the contextual score.

In order to determine a contextual score at operation 510, the contextual evaluation circuitry 212 may compare each of the contextual parameters with historical contextual device data indicative of the user and associated user device's 106 context in prior inputs of the identification code. This historical contextual device data may be stored, for instance, in the contextual parameter database 110. This comparison and subsequent combination of available contextual parameters may be accomplished via a polynomial regression technique resulting in a contextual score that ranges between, for example, one (1) and five (5). As would be evident to one of ordinary skill in the art in light of the present disclosure, a contextual score of five (5) may be indicative of a reliable and secure context of the user and user device 106 during input of the identification code. In contrast, a contextual score of one (1) may be indicative of an unreliable and unsecure context of the user and user device 106 during input of the identification code. In some embodiments, the contextual evaluation circuitry 212 may at operation 510 consider each of the available contextual parameters equally in determining a contextual score. In other embodiments, the contextual evaluation circuitry 212 may employ weighted criteria such that some contextual parameters have increased weighting relative to other contextual parameters. By way of example, an entity (e.g., financial institution or otherwise) may place increased importance on the IP address and/or username of the user as indicative of a secure context. In such an example, the contextual evaluation circuitry 212 may weigh IP data and identification data such that these contextual device data sources are ranked higher than other contextual device data sources (e.g., contextual parameters).

Thereafter, as shown in operation 515, the apparatus (e.g., contextual authentication server 200) includes means, such as processor 202, contextual evaluation circuitry 212, authentication circuitry 214, or the like, for determining if the contextual score satisfies the secure context thresholds. By way of example, the authentication circuitry 212 may define a minimum contextual score of four (4). In an instance in which the contextual score satisfies the secure context threshold of four (4) (e.g., by having a contextual score of four (4) or five (5)), the authentication circuitry 214 may establish the authentication online session at operation 520. In an instance in which the contextual score fails to satisfy the secure context threshold of four (4) (e.g., by having a contextual score of three (3) or less), the authentication circuitry 214 may request additional information from the user at operation 525.

As described above, various technical challenges are surmounted via technical solutions contemplated herein. For instance, example implementations of embodiments of the present invention may utilize a contextual authentication server to provide increased security in the establishment of authenticated online sessions. Embodiments of the present disclosure may first obtain an identification code (e.g., PIN input or otherwise) via presentation of an input pattern and corresponding detection of a user's gaze for inputting said identification code. During input of the identification code (e.g., via a user's eye(s)), contextual device data is received from a user device associated with the user for improving the securing associated with the session authentication process. In doing so, such example implementations confront and solve at least two technical challenges: (1) they reliably secure online sessions from unauthorized access, and (2) they avoid complications associated with retrieving and storing user biometric data.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the contextual authentication server 200 and executed by a processor 202 of the contextual authentication server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:
1. A method for establishing an authenticated online session, the method comprising:
receiving a request for an authenticated online session;
causing, by display circuitry, presentation of an input pattern to a user;
receiving, by gaze detection circuitry, one or more images of the user's eye captured during presentation of the input pattern;
determining an identification code input based, at least in part, on the one or more images captured during presentation of the input pattern;
determining, by the gaze detection circuitry, the identification code input satisfies identification criteria by matching, within at least a threshold accuracy, a verified identification code associated with the user;
receiving, by contextual evaluation circuitry and during presentation of the input pattern, a set of contextual parameters different from the identification code input, the set of contextual parameters including a first contextual parameter received from a user device associated with the user;
assigning a first weight to the first contextual parameter, the first weight indicative of a secure context importance associated with the first contextual parameter;

determining, via contextual determination circuitry, a contextual score based upon the first contextual parameter and the first weight;

determining the contextual score satisfies a secure context threshold; and establishing, by authentication circuitry, the authenticated online session, the authenticated online session requiring both the determination that the identification code input satisfies the identification criteria and the determination that the contextual score satisfies the secure context threshold.

2. The method according to claim 1, wherein causing presentation of the input pattern to the user further comprises displaying the input pattern on a screen of the user device.

3. The method according to claim 1, wherein causing presentation of the input pattern to the user further comprises displaying the input pattern as an augmented reality object.

4. The method according to claim 1, wherein the input pattern comprises a plurality of alphanumeric characters.

5. The method according to claim 1, wherein determining the identification code further comprises:
identifying, via the gaze detection circuitry, a gaze direction of the user's eye;
comparing, via the gaze detection circuitry, the gaze direction of the user's eye with a corresponding location defined by the input pattern; and
determining, via the gaze detection circuitry, the identification code input based upon a correlation between the gaze direction and the corresponding location of the input pattern.

6. The method according to claim 5, wherein the gaze direction of the user's eye is iteratively identified over a time in which the identification code input is inputted.

7. The method according to claim 1, wherein the set of contextual parameters comprise one or more of device orientation data, entry speed data, device proximity data, device altitude data, device location data, internet protocol (IP) data, or identification data.

8. The method according to claim 1, further comprising determining, via the contextual determination circuitry, the contextual score via a polynomial regression.

9. The method according to claim 1, further comprising:
receiving a second contextual parameter in the set of contextual parameters, the second contextual parameter received from a device separate from the user device;
assigning a second weight to the second contextual parameter, the second weight indicative of a secure context importance of the second contextual parameter, wherein the second weight is different than the first weight; and
determining the contextual score based upon the first contextual parameter, the first weight, the second contextual parameter, and the second weight.

10. The method of claim 1, wherein the verified identification code associated with the user comprises a plurality of alphanumeric characters and the threshold accuracy comprises a threshold number of the plurality of alphanumeric characters in the verified identification code.

11. An apparatus for establishing an authenticated online session, the apparatus comprising:
communications circuitry configured to receive a request for an authenticated online session;
display circuitry configured to cause presentation of an input pattern to a user;
gaze detection circuitry configured to:
receive one or more images of the user's eye captured during presentation of the input pattern,
determine an identification code input based, at least in part, on the one or more images captured during presentation of the input pattern, and
determine the identification code input satisfies identification criteria by matching, within at least a threshold accuracy, a verified identification code associated with the user;
contextual evaluation circuitry configured to:
receive a set of contextual parameters different from the identification code input, the set of contextual parameters including a first contextual parameter received from of a user device associated with the user during presentation of the input pattern,
assign a first weight to the first contextual parameter, the first weight indicative of a secure context importance associated with the first contextual parameter, and
determine a contextual score based upon the first contextual parameter and the first weight; and
authentication circuitry configured to:
determine the contextual score satisfies a secure context threshold, and
establish the authenticated online session, the authenticated online session requiring both the determination that the identification code input satisfies the identification criteria and the determination that the contextual score satisfies the secure context threshold.

12. The apparatus according to claim 11, wherein the display circuitry is further configured to cause presentation of the input pattern on a screen of the user device.

13. The apparatus according to claim 11, wherein the display circuitry is further configured to display the input pattern as an augmented reality object.

14. The apparatus according to claim 11, wherein the input pattern comprises a plurality of alphanumeric characters.

15. The apparatus according to claim 11, wherein the gaze detection circuitry is further configured to:
identify a gaze direction of the user's eye;
compare the gaze direction of the user's eye with a corresponding location defined by the input pattern; and
determine the identification code input based upon a correlation between the gaze direction and the corresponding location of the input pattern.

16. The apparatus according to claim 15, wherein the gaze detection circuitry is further configured to iteratively identify the gaze direction of the user's eye over a time in which the identification code input is inputted.

17. The apparatus according to claim 11, wherein the set of contextual parameters comprise one or more of device orientation data, entry speed data, device proximity data, device altitude data, device location data, Internet protocol (IP) data, or identification data.

18. A non-transitory computer-readable storage medium for using an apparatus to establish an authenticated online session, the non-transitory computer-readable storage medium storing instructions that, when executed, cause the apparatus to:
receive a request for an authenticated online session;
cause presentation of an input pattern to a user;
receive one or more images of the user's eye captured during presentation of the input pattern;

determine an identification code input based, at least in part, on the one or more images captured during presentation of the input pattern, and determine the identification code input satisfies identification criteria by matching, within at least a threshold accuracy, a verified identification code associated with the user;

receive a set of contextual parameters different from the identification code input, the set of contextual parameters including a first contextual parameter received from of a user device associated with the user during presentation of the input pattern;

assigning a first weight to the first contextual parameter, the first weight indicative of a secure context importance associated with the first contextual parameter;

determine a contextual score based upon the first contextual parameter and the first weight;

determine the contextual score satisfies a secure context threshold; and establish the authenticated online session, the authenticated online session requiring both the determination that the identification code input satisfies the identification criteria and the determination that the contextual score satisfies the secure context threshold.

19. The apparatus according to claim 11, wherein the contextual evaluation circuitry is further configured to:

receive a second contextual parameter in the set of contextual parameters, the second contextual parameter received from a device separate from the user device;

assign a second weight to the second contextual parameter, the second weight indicative of a secure context importance of the second contextual parameter, wherein the second weight is different than the first weight; and determine the contextual score based upon the first contextual parameter, the first weight, the second contextual parameter, and the second weight.

20. The apparatus of claim 11, wherein the verified identification code associated with the user comprises a plurality of alphanumeric characters and the threshold accuracy comprises a threshold number of the plurality of alphanumeric characters in the verified identification code.

* * * * *